United States Patent
Boettcher

(10) Patent No.: US 10,399,603 B2
(45) Date of Patent: Sep. 3, 2019

(54) VEHICLE FRAME STRUCTURAL MEMBER ASSEMBLY AND METHOD

(71) Applicant: Honda Motor Co., Ltd., Tokyo (JP)

(72) Inventor: Eric J. Boettcher, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/671,185

(22) Filed: Aug. 8, 2017

(65) Prior Publication Data
US 2018/0009483 A1 Jan. 11, 2018

Related U.S. Application Data

(63) Continuation of application No. 15/016,960, filed on Feb. 5, 2016, now Pat. No. 9,764,769.

(60) Provisional application No. 62/114,046, filed on Feb. 9, 2015, provisional application No. 62/259,102, filed on Nov. 24, 2015.

(51) Int. Cl.
*B62D 25/04* (2006.01)
*B62D 29/00* (2006.01)

(52) U.S. Cl.
CPC .......... *B62D 25/04* (2013.01); *B62D 29/002* (2013.01); *B62D 29/005* (2013.01)

(58) Field of Classification Search
CPC ....... B62D 25/02; B62D 25/04; B62D 29/002
See application file for complete search history.

(56) References Cited

U.S. PATENT DOCUMENTS

| 5,344,208 | A | 9/1994 | Bien et al. |
| 5,806,915 | A | 9/1998 | Takabatake |
| 6,058,673 | A | 5/2000 | Wycech |
| 6,092,864 | A | 7/2000 | Wycech et al. |
| 6,165,588 | A | 12/2000 | Wycech |
| 6,186,581 | B1 | 2/2001 | Onoue |
| 6,247,287 | B1 | 6/2001 | Takabatake |
| 6,305,136 | B1 | 10/2001 | Hopton et al. |
| 6,357,819 | B1 | 3/2002 | Yoshino |
| 6,378,933 | B1 | 4/2002 | Schoen et al. |
| 6,419,305 | B1 | 7/2002 | Larsen |
| 6,467,834 | B1 | 10/2002 | Barz et al. |
| 6,471,285 | B1 | 10/2002 | Czaplicki et al. |
| 6,474,723 | B2 | 11/2002 | Czaplicki et al. |
| 6,482,486 | B1 | 11/2002 | Czaplicki et al. |
| 6,494,525 | B1 | 12/2002 | Blank |
| 6,575,526 | B2 | 6/2003 | Czaplicki et al. |
| 6,619,727 | B1 | 9/2003 | Barz et al. |
| 6,641,208 | B2 | 11/2003 | Czaplicki et al. |
| 6,729,425 | B2 | 5/2004 | Schneider et al. |
| 6,777,049 | B2 | 8/2004 | Sheldon et al. |
| 6,786,533 | B2 | 9/2004 | Bock et al. |

(Continued)

FOREIGN PATENT DOCUMENTS

| CN | 1732215 | 2/2006 |
| CN | 103847799 | 6/2014 |

(Continued)

OTHER PUBLICATIONS

Search Report of Chinese Serial No. 201610083879.X dated Jan. 21, 2019, 2 pages.

*Primary Examiner* — Dennis H Pedder
(74) *Attorney, Agent, or Firm* — Rankin, Hill & Clark LLP

(57) ABSTRACT

A vehicle frame structural member assembly method includes an elongated frame member and a reinforcement member. The reinforcement member is complementarily arranged adjacent the elongated frame member.

15 Claims, 11 Drawing Sheets

(56) References Cited

U.S. PATENT DOCUMENTS

| | | |
|---|---|---|
| 6,793,274 B2 | 9/2004 | Riley et al. |
| 6,866,331 B2 | 3/2005 | Kropfeld |
| 6,880,657 B2 | 4/2005 | Schneider et al. |
| 6,883,858 B2 | 4/2005 | Barz |
| 6,905,745 B2 | 6/2005 | Sheldon et al. |
| 6,928,736 B2 | 8/2005 | Czaplicki et al. |
| 6,929,312 B2 | 8/2005 | Rich et al. |
| 6,932,421 B2 | 8/2005 | Barz |
| 6,938,947 B2 | 9/2005 | Barz et al. |
| 6,941,719 B2 | 9/2005 | Busseuil et al. |
| 6,953,219 B2 | 10/2005 | Lutz et al. |
| 7,025,409 B2 | 4/2006 | Riley et al. |
| 7,077,460 B2 | 7/2006 | Czaplicki et al. |
| 7,077,461 B2 | 7/2006 | Ratet |
| 7,105,112 B2 | 9/2006 | Czaplicki et al. |
| 7,111,899 B2 | 9/2006 | Gray |
| 7,140,668 B2 | 11/2006 | Wesch et al. |
| 7,144,071 B2 | 12/2006 | Le Gall et al. |
| 7,160,491 B2 | 1/2007 | Barz et al. |
| 7,249,415 B2 | 7/2007 | Larsen et al. |
| 7,255,388 B2 | 8/2007 | Le Gall et al. |
| 7,290,828 B2 | 11/2007 | Kosal et al. |
| 7,374,219 B2 | 5/2008 | Brennecke |
| 7,422,088 B2 | 9/2008 | Ito |
| 7,428,774 B2 | 9/2008 | Thomas et al. |
| 7,455,350 B2 | 11/2008 | Bünte |
| 7,641,264 B2 | 1/2010 | Niezur et al. |
| 7,673,930 B2 | 3/2010 | Stratman |
| 7,695,040 B2 | 4/2010 | Brennecke |
| 7,735,906 B2 | 6/2010 | Takahashi et al. |
| 7,748,773 B2 | 7/2010 | Niezur et al. |
| 7,784,186 B2 | 8/2010 | White et al. |
| 7,790,280 B2 | 9/2010 | Busseuil et al. |
| 7,815,252 B2 | 10/2010 | Huelke |
| 7,838,100 B2 | 11/2010 | McLeod et al. |
| 7,892,392 B2 | 2/2011 | Wang et al. |
| 7,913,467 B2 | 3/2011 | Schneider et al. |
| 7,926,867 B2 | 4/2011 | Kochert et al. |
| 7,941,925 B2 | 5/2011 | Larsen et al. |
| 8,020,924 B2 | 9/2011 | Niezur et al. |
| 8,047,603 B2 | 11/2011 | Goral et al. |
| 8,127,506 B2 | 3/2012 | Schneider et al. |
| 8,215,704 B2 | 7/2012 | Monnet et al. |
| 8,322,780 B2 | 12/2012 | Nagwanshi et al. |
| 8,361,589 B2 | 1/2013 | Kraushaar |
| 8,398,138 B2 | 3/2013 | Mildner et al. |
| 8,430,448 B2 | 4/2013 | Richardson et al. |
| 8,449,020 B2 | 5/2013 | Schneider et al. |
| 8,449,701 B2 | 5/2013 | Allen et al. |
| 8,511,743 B2 | 8/2013 | Kraushaar |
| 8,530,015 B2 | 9/2013 | Mendiboure et al. |
| 8,597,763 B2 | 12/2013 | Lehmann et al. |
| 8,671,573 B2 | 3/2014 | Larsen et al. |
| 8,746,780 B2 | 6/2014 | Belpaire et al. |
| 8,752,884 B2 | 6/2014 | Hulett et al. |
| 8,801,079 B2 | 8/2014 | Shantz et al. |
| 8,926,005 B2 | 1/2015 | Barz et al. |
| 2001/0020794 A1 | 9/2001 | Ishikawa |
| 2001/0042353 A1 | 11/2001 | Honda et al. |
| 2002/0027379 A1 | 3/2002 | Czaplicki |
| 2002/0033617 A1 | 3/2002 | Blank |
| 2002/0125739 A1 | 9/2002 | Czaplicki et al. |
| 2004/0026960 A1 | 2/2004 | Czaplicki et al. |
| 2004/0046421 A1 | 3/2004 | Barz |
| 2004/0104598 A1 | 6/2004 | Barz et al. |
| 2004/0164588 A1 | 8/2004 | Lutz et al. |
| 2004/0207233 A1 | 10/2004 | Bock et al. |
| 2004/0217626 A1 | 11/2004 | Barz et al. |
| 2004/0222666 A1 | 11/2004 | Kropfeld |
| 2004/0227377 A1 | 11/2004 | Gray |
| 2004/0239148 A1 | 12/2004 | Ratet |
| 2004/0256888 A1 | 12/2004 | Le Gall et al. |
| 2004/0256889 A1 | 12/2004 | Schonebeck et al. |
| 2005/0040671 A1 | 2/2005 | Barz |
| 2005/0082872 A1 | 4/2005 | Rich et al. |
| 2005/0212326 A1 | 9/2005 | Marion |
| 2005/0212332 A1 | 9/2005 | Sheldon et al. |
| 2005/0218697 A1 | 10/2005 | Barz et al. |
| 2006/0006695 A1 | 1/2006 | Lutz et al. |
| 2007/0018483 A1 | 1/2007 | Kerscher et al. |
| 2007/0075569 A1 | 4/2007 | Barz et al. |
| 2007/0257515 A1 | 11/2007 | Larsen et al. |
| 2008/0111394 A1 | 5/2008 | Lewis |
| 2008/0143143 A1 | 6/2008 | Brennecke |
| 2008/0231078 A1 | 9/2008 | Tomozawa |
| 2008/0296164 A1 | 12/2008 | Dajek et al. |
| 2009/0167055 A1 | 7/2009 | Niezur et al. |
| 2010/0117397 A1 | 5/2010 | Richardson et al. |
| 2010/0314813 A1 | 12/2010 | Wojtowicki et al. |
| 2013/0133771 A1 | 5/2013 | Richardson et al. |
| 2014/0159421 A1 | 6/2014 | Schneider et al. |
| 2014/0265443 A1 | 9/2014 | Meaige et al. |
| 2014/0292029 A1 | 10/2014 | White et al. |
| 2015/0360733 A1 | 12/2015 | Nagwanshi et al. |

FOREIGN PATENT DOCUMENTS

| | | |
|---|---|---|
| JP | 2005238991 | 9/2005 |
| KR | 1998038929 | 8/1998 |

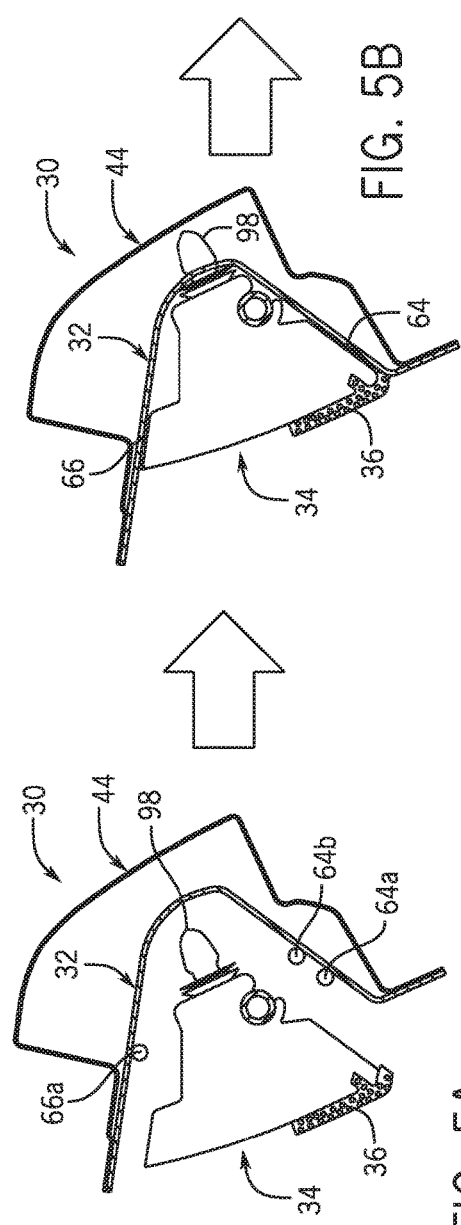
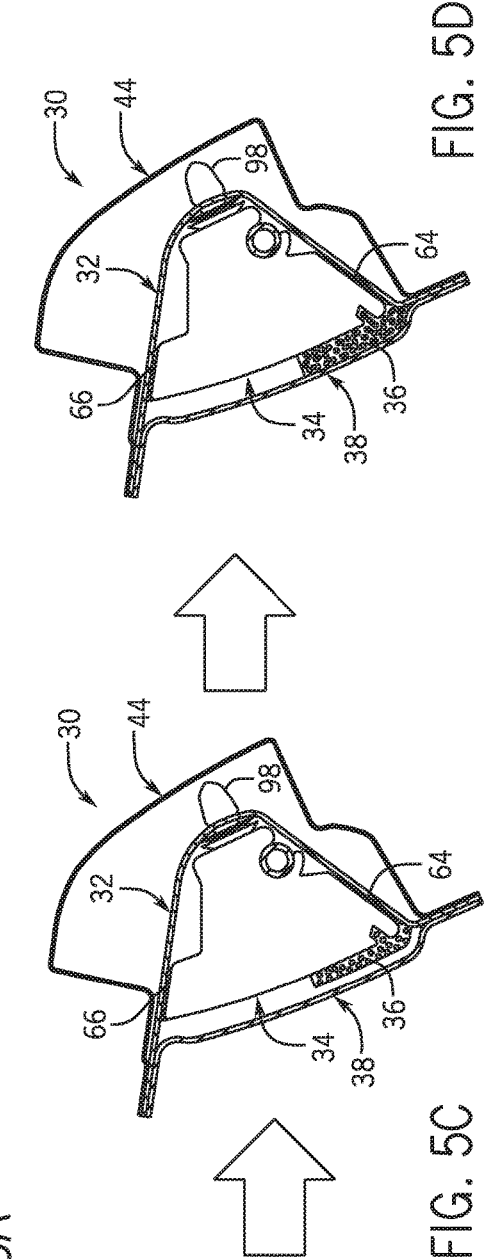

VEHICLE FRAME STRUCTURAL MEMBER ASSEMBLY AND METHOD

The present application is a continuation of U.S. Ser. No. 15/016,960 filed Feb. 5, 2016, which claims priority to U.S. Prov. Patent App. Ser. Nos. 62/114,046, filed Feb. 9, 2015, and 62/259,102 filed Nov. 24, 2015, the disclosures of each being incorporated herein by reference.

BACKGROUND

Vehicle frames and constructions therefor are increasingly complex as vehicle manufacturers look for new ways to improve structural integrity of the vehicle frame while maintaining and/or reducing the overall weight of the vehicle frame. These are often competing concerns. That is, increasing the structural integrity of the vehicle frame (e.g., improving crash performance) often involves adding weight to the vehicle frame. Conversely, reducing the weight of the vehicle frame must be done carefully so as to avoid adversely changing the structural integrity of the vehicle frame. A number of technologies and methods are known for improving the integrity of the vehicle frame and some of these are also concerned with limiting the amount of weight added to the vehicle frame.

In particular, current mass production structural design for vehicles is dominated by stamped metal, which uses section size, material gauge and grade, and typically spot welding to achieve performance requirements. To facilitate fuel economy improvement, supported by weight reduction, new concepts are needed to deliver fundamental weight reduction at a reasonable value. Concepts which can avoid exotic lightweight materials are preferred, particularly those that preserve current manufacturing infrastructure related to spot welding and stamped metal. One known countermeasure is the employment of structural reinforcements. However, the choice of materials and/or execution of designs using such structural reinforcements have been lacking thus far.

SUMMARY

According to one aspect, a vehicle frame structural member assembly includes an elongated frame member, a reinforcement member and a structural foam. The reinforcement member is complementarily arranged adjacent the elongated frame member. The reinforcement member is formed from a plastic material. The structural foam is attached to the reinforcement member.

According to another aspect, a vehicle frame structural member assembly method is provided. More particularly, according to one aspect, the method includes attaching a structural foam to a reinforcement member and complementarily positioning the reinforcement member adjacent an elongated frame member. The reinforcement member is formed from a plastic material.

According to still another aspect, a vehicle frame structural member assembly includes an elongated frame member, a fiber reinforced plastic reinforcement member and a structural foam. The fiber reinforced plastic reinforcement member is complementarily positioned adjacent the elongated frame member for reinforcing the elongated frame member. The structural foam is overmolded onto the reinforcement member.

According to still yet another aspect, an internal reinforcement includes an elongate body including a base positioned opposite a crown, a shelf extending along the crown and a compressive member extending along the base. The shelf includes a surface positionable parallel to a first leg of a concave frame structure. The compressive member includes a first wall with a surface positionable parallel to a second leg of the concave frame structure.

According to a further aspect, a vehicle frame structural member assembly includes an elongated structural member and a reinforcement positioned in a hollow chamber of the hollow structural member. The elongated structural member includes a concave frame member having a body with a first leg and a second leg extending therefrom, and an inner frame member extending from the first leg to the second leg. The elongated frame member and the inner frame member define the hollow chamber therein. The reinforcement includes an elongate body having a base positioned opposite a crown, a shelf extending along the crown and a compressive member extending along the base. The shelf includes a surface positioned parallel to the first leg of the concave frame member. The compressive member includes a first wall with a surface positioned parallel to the second leg of the concave frame member. The vehicle frame assembly further includes a first adhesive positioned between the shelf and the first leg and a second adhesive positioned between the first wall and the second leg.

BRIEF DESCRIPTION OF THE DRAWINGS

FIGS. 5A-5D are cross-sectional views similar to FIG. 4 but schematically showing a manufacturing process wherein the reinforcement member is complementarily positioned adjacent the elongated frame member and secured thereto.

DETAILED DESCRIPTION

Figure 7:
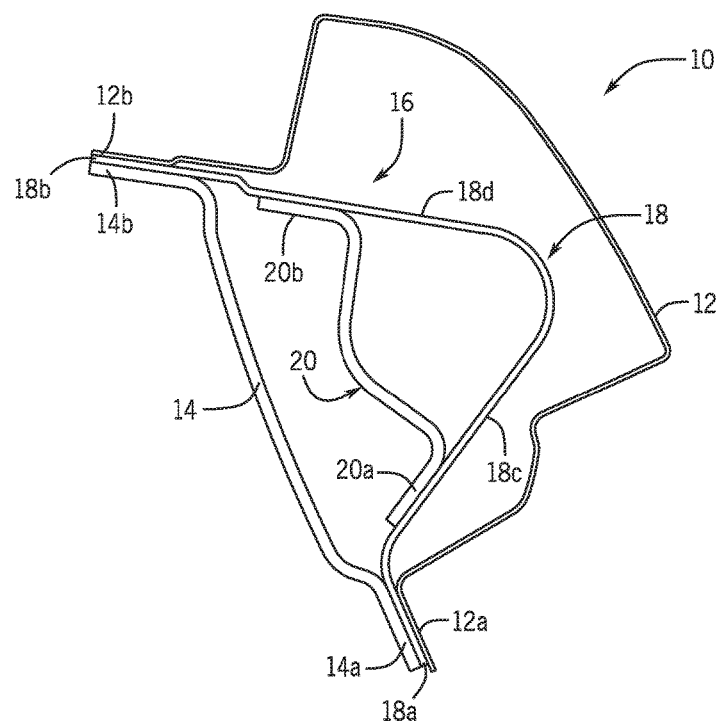
FIG. 7 is a cross-sectional view of a known vehicle frame structural member assembly.

FIG. 7 illustrates a known vehicle frame structural member assembly generally indicated by reference numeral 10. As will be understood and appreciated by those skilled in the art, the illustrated assembly can be the A-pillar, and particularly an upper section of the A-pillar disposed along a vehicle windshield (not shown). The assembly 10 includes an outer frame member 12 having mating flanges 12a, 12b and an inner frame member 14 having mating flanges 14a, 14b. As is known, the mating flanges 12a, 12b and 14a, 14b can be spot welded to one another to form the closed profile structural member assembly 10. The assembly 10 further includes an internal stiffener or reinforcement 16 comprised of an outer stiffener member 18 having mating flanges 18a, 18b and an inner stiffener member 20 having flanges 20a, 20b.

As shown, the mating flange 18a can be sandwiched between the mating flanges 12a, 14a of the inner and outer frame members 12, 14. Likewise, the mating flange 18b can be sandwiched between the mating flanges 12b, 14b of the outer and inner frame members 12, 14. Accordingly, the mating flanges 18a, 18b can be spot welded together with the mating flanges 12a, 12b, 14a, 14b as is known and understood by those skilled in the art. The flanges 20a, 20b of the inner stiffener member 20 can be welded to, respectively, lower and upper sections 18c, 18d of the outer stiffener member 18 as shown.

The outer frame member 12, the inner frame member 14, the outer stiffener member 18 and the inner stiffener member 20 generally comprise the components of the assembly 10. These components are each typically formed of a metal, such as steel or aluminum. Conventionally, these are stamped metal pieces. To provide desired performance characteristics, these components tend to be formed of stamped steel and have relatively thick gauges. For example, the outer frame member 12 can be formed of a mild steel having a gauge of 0.65 mm to 0.75 mm (e.g., 0.7 mm), the inner frame member 14 can be formed from an advanced high strength steel (AHSS) sheet having a gauge of 1.8 mm to 2.33 mm (e.g., 1.8 mm), the outer stiffener member 18 can be formed from an ultra-high strength steel (UHSS) sheet having a gauge of 1.6 mm to 2.00 mm (e.g., 1.6 mm) and the inner stiffener member 20 can be formed from an AHSS sheet having a gauge of 2.0 mm to 2.3 mm (e.g., 2.0 mm).

Figure 1:
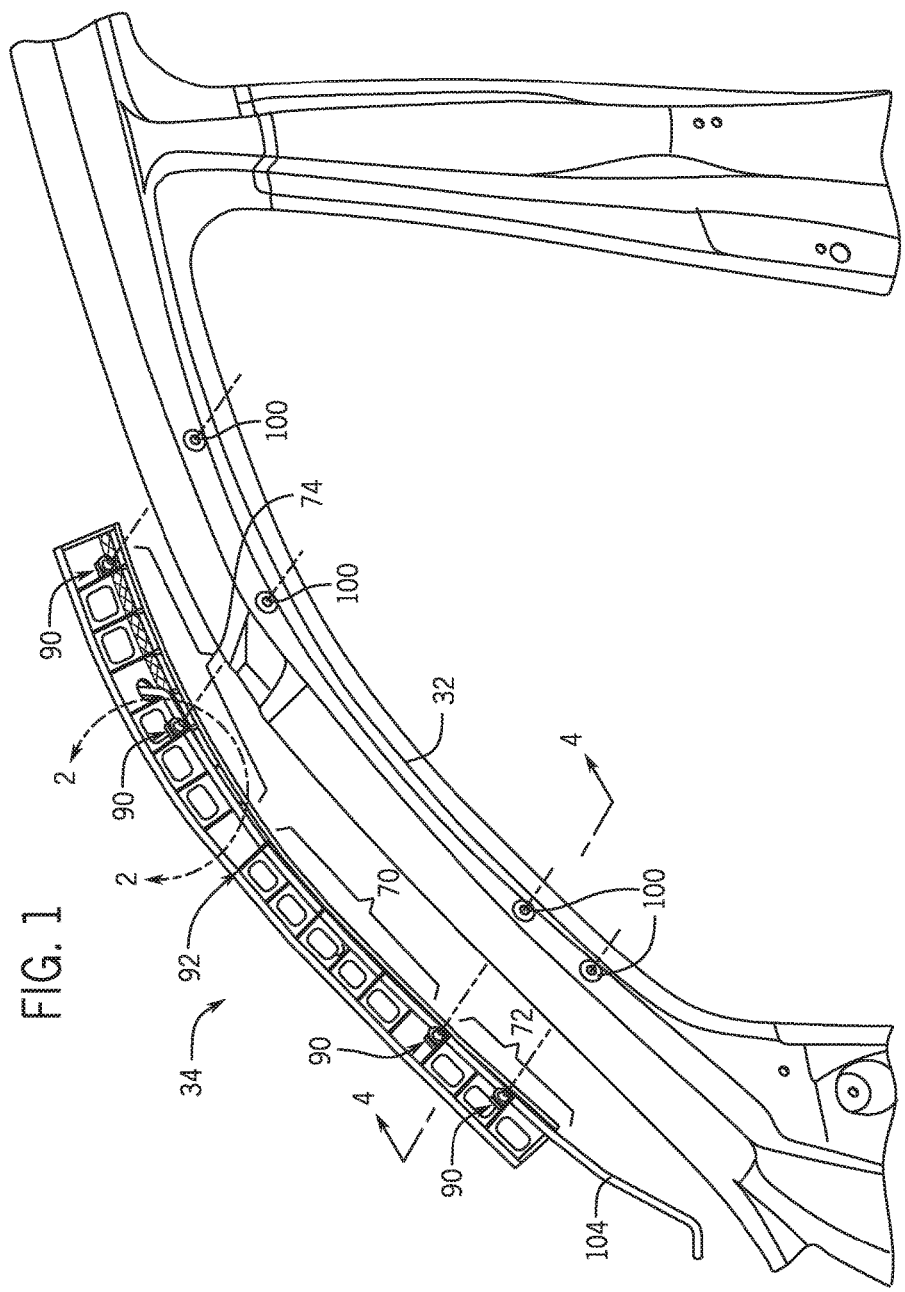
FIG. 1 is an exploded partial perspective view of a vehicle frame structural member assembly according to an exemplary embodiment shown including an elongated frame member and a reinforcement member ready to be assembled onto the elongated frame member.

Referring now to FIGS. 1-4 wherein the showings are for purposes of illustrating one or more exemplary embodiments and not for purposes of limiting the same, a vehicle frame structural member assembly according to an exemplary embodiment is generally designated by reference numeral 30. As shown, the assembly 30 includes an elongated frame member 32 (also referred to as a concave frame structure) and a reinforcement member 34 complementarily arranged adjacent the elongated frame member 32. As shown, the elongated frame member 32 of the assembly 30 can be an A-pillar frame member with the reinforcement member 34 disposed along an upper or windshield portion of the A-pillar frame member (as best shown in FIG. 1). In one embodiment, the elongated frame member 32 can be similar to the stiffener member 18 of the known design, though the elongated frame member 32 can be of a reduced gauge thickness due to the performance enhancing characteristics of the reinforcement member 34 and/or the various structural advantages of the assembly 30 that will be described in further detail below. Thus, the elongated frame member 32 can be a stamped metal member, such as a stamped steel or stamped aluminum member. In an exemplary embodiment, the elongated frame member 32 is formed via hot stamping of a high strength boron-containing steel having an aluminum silicate coating. An example of such a steel with an AlSi coating is commercially available under the designation Usibor® 1500 from ArcelorMittal.

As will be described in further detail below, the reinforcement member 34, which can also be referred to as an internal reinforcement, has an elongate body 34a that can be formed from a polymeric material. In one embodiment, the reinforcement member 34 is formed from a fiber reinforced plastic including a plastic matrix material that encapsulates a fiber material. Polymeric materials include, but are not limited to, nylon, polyamide, polyester, polypropylene, polyethylene, or others. The polymeric material may be filled or unfilled. For example, the polymeric material may be filled with glass, carbon, or other reinforcement fibers. In another example, the matrix material can be nylon and/or the fiber material can be a plurality of glass fibers. As a more specific example, the matrix material can be nylon that is PA66 or better and/or the glass fibers can be provided in different lengths. In another specific example, the plastic component of the matrix material can be nylon PPA (polyphthalamide), nylon PA9T (poly 1,9-nonamethylene terephthalamide), or some other nylon having a relatively high glass transition temperature (Tg), such as relative to nylon PA66.

Figure 4:
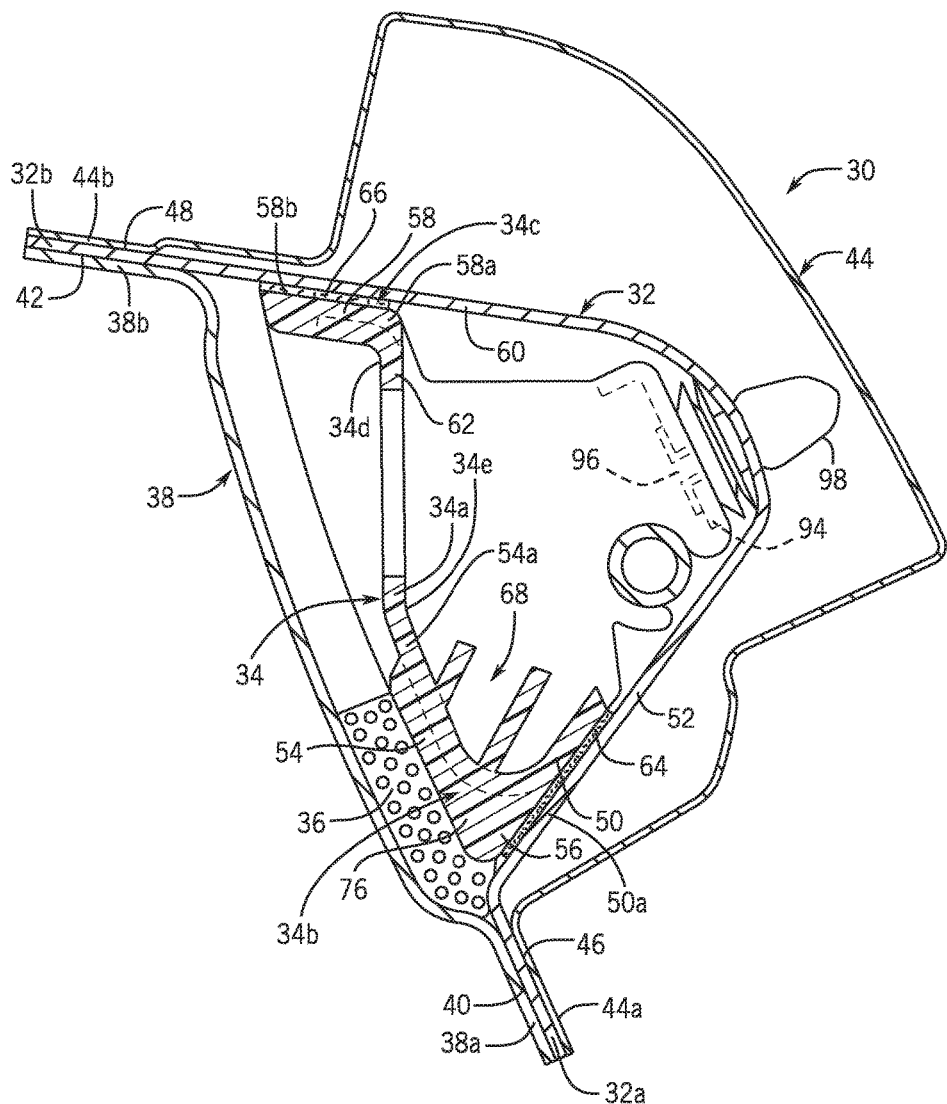
FIG. 4 is a cross-sectional view taken along the line 4-4 of FIG. 1 but shown in an assembled state with inner and outer frame members secured to the elongated frame member.

Additionally, as best shown in FIG. 4, the assembly 30 can include a structural foam 36 attached to the reinforcement member 34. The structural foam 36 can be a heat activated epoxy foam. The structural foam 36 can be overmolded onto the reinforcement member 34 to thereby attach the structural foam 36 to the reinforcement member 34. In one embodiment, the structural foam 36 is a heat activated epoxy foam that is initially overmolded onto the reinforcement member 34 and later heat activated to expand and bond with the reinforcement member 34. For example, the structural foam 36 can be a heat-activated epoxy-based resin having foamable characteristics upon activation through the use of heat such as is received in an e-coat or other automotive/vehicle paint oven operation. In particular, as the structural foam 36 is heated, it expands, cross-links, and structurally bonds to adjacent surfaces. An example of a preferred formulation is an epoxy-based material that may include polymer modificis such as an ethylene copolymer or terpolymer that is commercially available from L&L Products, Inc. of Romeo, Mich., under the designations that include L-5204, L-5207, L-5214, L-5234, L-5235, L-5236, L-5237, L-5244, L-5505, L-5510, L-5520, L-5540, L-5573 or combinations thereof. Such materials may exhibit properties including relatively high strength and stiffness, promote adhesion, rigidity, and impart other valuable physical and chemical characteristics and properties. In one exemplary embodiment, the structural foam is the commercially available material sold under the designation L-5520 by L&L Products, Inc., or an equivalent material. In another exemplary embodiment, the structural foam is the commercially available material sold under the designation L5505 by L&L Products, Inc., or an equivalent material. This latter exemplary embodiment (i.e., using L5505) can impart higher energy absorption characteristics and/or a higher peak load limit to the assembly 30 as compared to the former exemplary embodiment (i.e., using L5520).

The assembly 30 can further include an inner frame member 38 having mating flanges 38a, 38b that mate with inner sides 40, 42 of mating flanges 32a, 32b of the reinforcement member 34. As shown in the illustrated embodiment, the structural foam 36 can be interposed between the reinforcement member 34 and the inner frame member 38. Optionally, the inner frame member 38 can be constructed the same or similar to the inner frame member 14 of the known assembly 10. The assembly 30 can additionally include an outer frame member 44 having mating flanges 44a, 44b that mate with outer sides 46, 48 of the mating flanges 32a, 32b of the reinforcement member 34 on an opposite side of the reinforcement member 34 relative to the mating flanges 38a, 38b of the inner frame member 38. As shown, the outer frame member 44 can be constructed the same or similar as the outer frame member 12 of the known assembly 10.

Figure 14:
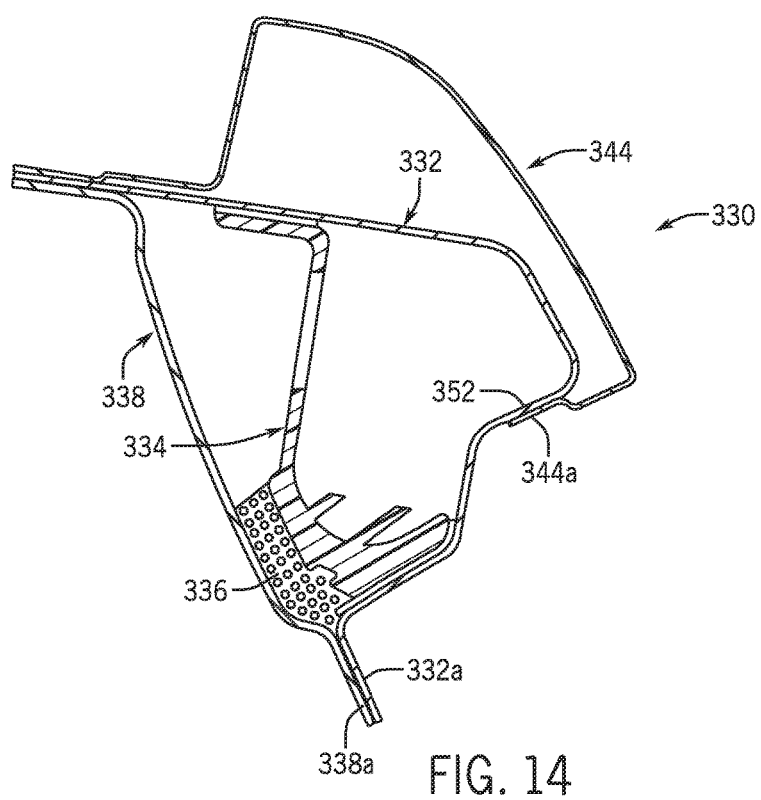
FIG. 14 is a cross-sectional view similar to FIG. 4 but showing a vehicle frame structural frame assembly according to an alternate exemplary embodiment.
Figure 15A:
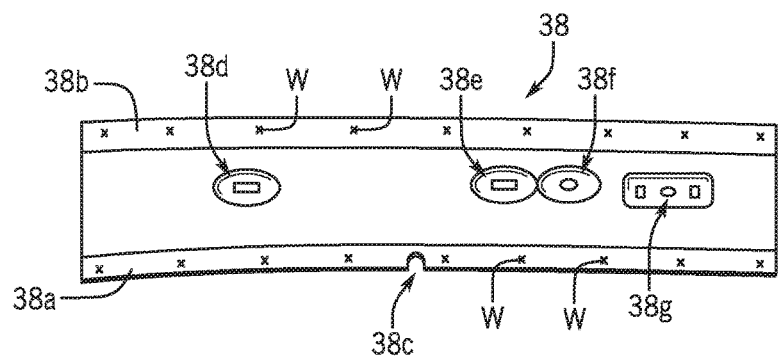
FIGS. 15A, 15B and 15C are schematic views of inner frame members according to various exemplary embodiments.
Figure 15B:
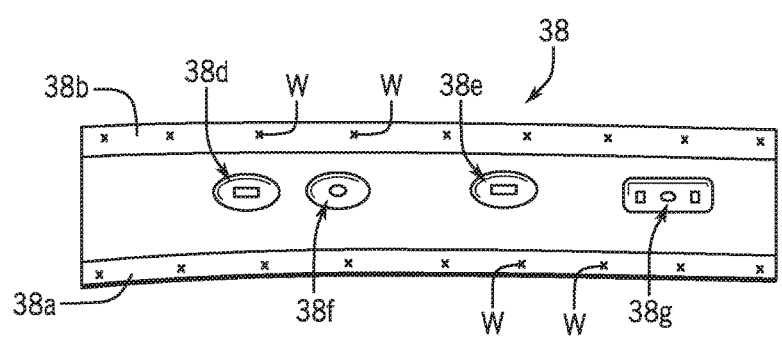
Figure 15C:
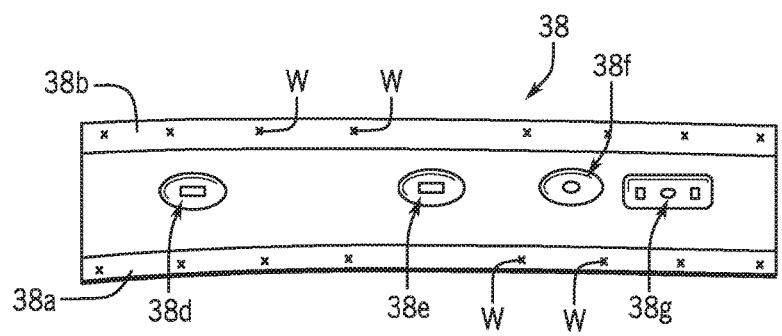

With reference to FIGS. 15A, 15B and 15C, partial schematic views of several variations of inner frame members are shown according to exemplary embodiments. Each of these can be applied to the inner frame member 38 (or the inner frame member 338 of FIG. 14). In particular, FIG. 15A shows the inner frame member 38 having a notch 38c disposed along the flange 38a. In one embodiment, the notch 38c is disposed at or near a midpoint of the inner frame member 38 relative to a longitudinal extent of the inner frame member 38 for imparting a deformation zone to the inner frame member 38 at or near the midpoint of the inner frame member 38. As shown, the inner frame member 38 of FIG. 15A can define a plurality of apertures, which in the illustrated embodiment includes an elongated apertures 38d, 38e than can be trim mounting holes, a round aperture 38f that can be a harness mounting hole and aperture set 38g that can be for mounting an orienting a side curtain airbag (not shown). Of course, more or fewer apertures could be provided and/or any of the provided apertures can vary in shape, size, function, etc. Weld locations W are schematically shown disposed in spaced apart relation along the flanges 38a and 38b. In particular, in FIG. 15A, the weld locations W are spaced apart equally along the flanges 38a and 38b (i.e., the spacing between adjacent weld locations is generally constant).

FIG. 15B shows a variation for the inner frame member 38 (or the inner frame member 338 of FIG. 14). In particular, the inner frame member 38 of FIG. 15B does not include a notch and includes the apertures 38d-38g rearranged and/or repositioned relative to those of FIG. 15A. In particular, the round aperture 38f is moved so as to be located between the elongated apertures 38d and 38e. This arrangement moves the deformation zone away from the midpoint of the inner frame member (e.g., slightly to the left in FIG. 15B). The weld locations W and relative spacing therebetween are shown as being the same in FIG. 15B as shown in FIG. 15A.

FIG. 15C shows a further variation for the inner frame member 38 (or the inner frame member 338 of FIG. 14). In particular, in FIG. 15C, the inner frame member 38 again does not include a notch and includes the apertures 38d-38g rearranged and/or repositioned relative to those of FIGS. 15A and 15B. In particular, the elongated aperture 38d is moved nearer to the left side end shown in FIG. 15C, the elongated aperture 38e is moved to the approximate midpoint of the inner frame member 38 and the round aperture 38f is moved nearer the right side end shown in FIG. 15C (i.e., round aperture 38f can be at the same location between FIGS. 15A and 15C). Also, the weld locations W and the relative spacing therebetween are varied in FIG. 15C relative to FIGS. 15A and 15B. In particular, no weld locations are provided at or near the midpoint of the inner frame member 38 of FIG. 15C. The positioning of the apertures 38d-38g and/or the lack of centrally located weld locations imparts a deformation zone to the inner frame member 38 at or near the midpoint of the inner frame member 38 without the need for a notch (e.g., notch 38c of FIG. 15A).

Of course, other variations are possible and the foregoing is only provided as non-limiting examples to show that notching, aperture location/positioning and/or weld location/spacing can be varied to impart the deformation zone to desired locations (e.g., centrally) on the inner frame member 38. It should be understood that other notches (including other sized notches and/or configurations), apertures, aperture locations and/or weld locations could be used to impart desired deformation characteristics to the inner frame member 38.

As best shown in FIG. 4, reinforcement member 34 includes a base 56 positioned opposite a crown 58. In particular, the base 56 is formed by a lower wall 50 and an inner wall 54, the inner wall 54 extending away from the lower wall 50. The lower wall 50 mates against a lower section 52 of the elongated frame member 32, an upper section 60 and the lower section 52 of the elongated frame member 32 together form the elongated frame member 32 as a concave frame structure and are alternately referred to as first and second legs of the concave frame structure, respectively. The inner wall 54 extends away from the lower section 52 of the elongated frame member 32. The reinforcement member 34 also includes the crown 58 formed by and alternatively referred to as an upper wall. The upper wall 58 mates against the upper section 60 of the elongated frame member 32. The reinforcement member 34 further includes an angled wall 62 extending upward from the inner wall 54, and particularly upward from a distal portion 54a of the inner wall 54 relative to the lower wall 50, to an outer end 58a of the upper wall 58. The upper wall 58 can be referred to as a shelf and has a surface 58b positionable parallel to the upper section 60, which can also be referred to as a first leg. As shown, adhesive 64 can be interposed between the lower wall 50 and the lower section 52 of the elongated frame member 32. Likewise, adhesive 66 can be interposed between the upper wall 58 and the upper section 60 of the elongated frame member 32.

The adhesive 64 and/or the adhesive 66 can have one component or two components. Suitable two-component adhesives can be room temperature curing or precuring two-component epoxy resin adhesives or polyurethane adhesives or (meth)acrylate adhesives. Room temperature precuring two-component epoxy resin adhesives or polyurethane adhesives or (meth)acrylate adhesives can be epoxy resin adhesives or polyurethane adhesives or (meth)acrylate adhesives which consist of two components, the mixing of which causes a reaction between the components, thus achieving at least a certain degree of crosslinking ("precured" or "precrosslinked"). Such adhesives are capable, in a further curing step, of reacting further, for example at elevated temperatures. These adhesives can have so-called precuring or pregelation in the first stage, and a heat-curing reaction stage at elevated temperature. Two-component epoxy resin adhesives can have a resin component comprising a glycidyl ether, a diglycidyl ether of bisphenol A and/or bisphenol F. In addition, they can have a hardener component comprising polyamines and/or polymercaptans. Such two-component epoxy resin adhesives can cure rapidly at room temperature after mixing of the two components, and are known to those skilled in the art. Two-component polyurethane adhesives can have polyisocyanates in one component, such as in the form of prepolymers having isocyanate groups, and polyols and/or polyamines in a second component. Such two-component polyurethane adhesives can cure rapidly at room temperature after mixing of the two components and are known to those skilled in the art. Two-component (meth)acrylate adhesives can have acrylic acid and/or methacrylic acid and/or esters thereof in one component. The second component can comprise a free-radical former, such as a peroxide. Such two-component (meth)acrylate adhesives cure rapidly at room temperature after mixing of the two components and are known to those skilled in the art.

As is known by those skilled in the art, room temperature curing two-component adhesives can also be cured under the influence of heat. This can lead to a more rapid reaction and thus to a shortening of the period of time until an adhesive bond produced therewith can be stressed with forces. Moreover, a heat treatment of such room temperature curing two-component adhesives can lead to higher strengths compared to those which do not undergo any such heat treatment.

In one exemplary embodiment, the adhesive 64 and/or the adhesive 66 can also be a heat-curing one-component epoxy resin adhesive. An example heat-curing one-component epoxy resin adhesive can comprise at least one epoxy resin and at least one thermally activable catalyst or a hardener B for epoxy resins which is activated by elevated temperature. Heating of such a one-component heat-curing one-component epoxy resin adhesive causes crosslinking. The heating is effected typically at a temperature of more than 70° C. Exemplary adhesives of this type include those commercially available in the SikaPower® product line from Sika Automotive AG of Switzerland, including adhesives sold by Sika Automotive AG under the designation SikaPower® 961 and SikaPower® 968. Preference may be given to the adhesive sold under the designation SikaPower® 968 as this adhesive has an adhesive strength that allows failure between adhered components in the assembly 30 to occur in the adhesive 64 or 66 and not in the components that are adhered together (e.g. not in the elongated frame member 32, such as between a boron-containing steel and its aluminum silicate coating).

As shown, the elongate body 34a of the reinforcement member 34 includes the base 56 positioned opposite the crown 58. The upper wall 58 forms a shelf that extends along the crown 58 that includes a surface 58b (FIG. 2) that is positionable parallel to the upper section 60, which can also be referred to as a first leg of the elongated frame member 32. The elongate body 34a further includes a first side 34d positioned opposite a second side 34e. The shelf (i.e., the upper wall 58) extends outward from the first side 34d.

Figure 2:
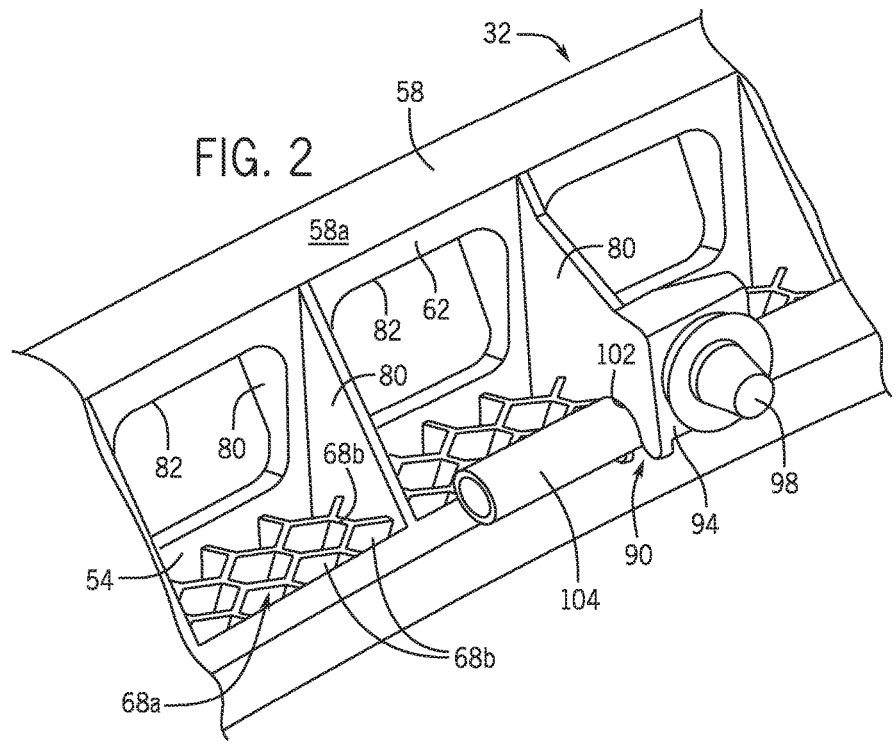
FIG. 2 is a partial enlarged view taken at the line 2-2 of FIG. 1 showing a clip structure extending from the reinforcement member for supporting an attachment clip and a sunroof drain tube.

As best shown in FIG. 2, a compressive member 68 extends along the base 56. The compressive member 68 includes the lower wall 50, which can be referred to as a first wall of the compressive member 68, having a surface 50a positionable parallel to the lower section 52 of the reinforcement member 32. The lower wall 50 extends outward from the second side 34e. The compressive member 68 also includes the inner wall 54, which can be referred to as a second wall of the compressive member 68, and an energy absorbing structure 68a extending between the first wall 50 and the second wall 54. In the illustrated embodiment, the energy absorbing structure 68a is a honeycomb structure formed of honeycomb patterned walls 68b.

In the illustrated embodiment, the honeycomb structure 68a can be disposed between the lower wall 50 and the inner wall 54. Advantageously, the honeycomb structure 68a efficiently distributes compressive loads in the reinforcement member 34. Along a longitudinal length of the reinforcement member 34, the thickness or gauge of the walls 68b forming the honeycomb structure 68a can have varying wall thicknesses. For example, referring to FIG. 1, the honeycomb structure 68a located along a central portion 70 can have a first thickness that is different or varies relative to the honeycomb structure 68a disposed along flanking portions 72, 74. By way of example, the wall thickness of the honeycomb structure 68a along the central portion 70 can be 1.5 mm and the honeycomb structure 68a along the flanking portions 72, 74 can be 2.0 mm. Arranging the honeycomb structure 68a with differing thicknesses can be strategically determined to get desired deformation from the assembly 30 at a desired location or locations therealong.

Figure 3:
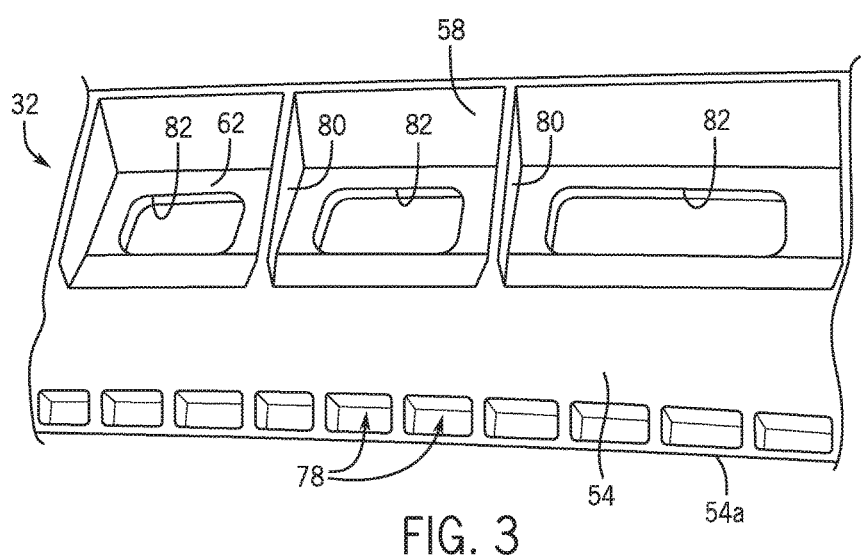
FIG. 3 is a rear side perspective view of the component shown in FIG. 2.

Again as best shown in FIG. 4, a larger cross-sectional area or thickness may be provided adjacent or at the apex 76 defined by the lower wall 50 and the inner wall 54. This has the benefit of better orienting long fibers, such as glass fibers, within the reinforcement member 34 along the longitudinal length thereof. Thus, the configuration of the reinforcement member 34 at the lower wall 50 and the inner wall 54 is sufficiently thick to orient the fibers, including also providing an area for an injection mold gate (not shown). More particularly, this configuration allows for more highly oriented flow with reduced shear stress during the injection molding process. This increases the likelihood that longer fibers will be parallel with a longitudinal length of the reinforcement member 34, particularly at or near the apex 76. With reference to FIG. 3, apertures, such as recesses or pockets 78, can be defined in the inner wall 54 near a lower edge 54a. As shown, the recesses 78 can have an "ice cube tray" configuration. These can assist in providing a varying contour to which the structural foam 36 can be overmolded during the overmolding step wherein the structural foam 36 is attached to the reinforcement member 34 and can reduce the potential for abnormal shrinkage or cracking.

A plurality of spaced apart ribs 80, which can also be referred to as a plurality of reinforcements, can be distributed along the longitudinal length of the reinforcement member 32. In the illustrated embodiment, the ribs 80 protrude from both sides of the angled wall 62 as shown. Also in the illustrated embodiment, a plurality of spaced part apertures 82 can be defined through the angled wall 62 and arranged between the spaced apart ribs 80.

In the illustrated embodiment, the reinforcement member 34 additionally includes clip structures 90, 92 extending toward the elongated frame member 32. In particular, in the illustrated embodiment, the clip structures 90, 92 are integrally formed with the spaced apart ribs 80 and can be referred to as integrally molded clip structures, though this is not required. Each of the clip structures can be at least one of: a drain tube clip that includes an aperture in which a sunroof drain tube is accommodated and/or an attachment clip that provides an attachment flange with an aperture in which an attachment clip is accommodated. For example, in the illustrated embodiment, the clip structures 90 are attachment clips that provide attachment flanges 94 with apertures 96 defined therein in which an attachment clip 98 is accommodated.

As shown, the attachment clip 98 can be used to at least temporarily secure the relative position of the reinforcement member 34 on the elongated frame member 32, such as during assembly of the elongated frame member 32 and the reinforcement member 34. More particularly, each attachment clip 98 can be received through a respective aperture 96 of a respective attachment flange 94 and then received through a respective aperture 100 defined in the elongated frame member 32. An exemplary function for the attachment clips 98 is to temporarily secure the reinforcement member 34 in position on the elongated frame member 32 until the adhesive 64, 66 and/or the structural foam 36 cures to permanently secure the reinforcement member 34 in position on the elongated frame member 32.

The clip structures 90 additionally are drain tube clips that include an aperture 102 in which a sunroof drain tube 104 is accommodated. In contrast, the clip structure 92 is only a drain tube clip that includes an aperture (not shown) in which the sunroof drain tube 104 is accommodated. Though not shown in the illustrated embodiment, the reinforcement member 34 could include clip structures that are only attachment clips and not drain tube clips.

With reference now to FIG. 14, a vehicle frame structural member assembly 330 is shown in cross section according to an alternate exemplary embodiment. Except as indicated hereinbelow and/or shown in FIG. 14, the assembly 330 can be the same or similar to the assembly 30 described above in reference to FIG. 1-4. More particularly, the assembly 330 of FIG. 14 can include an elongated frame member 332 and a reinforcement member 334 complementarily arranged adjacent the elongated frame member 332. With the exception of the variance in shape shown in FIG. 14, the elongated frame member 332 can be like the elongated frame member 32 of FIG. 4. Likewise, with the exception of the variance in shape shown in FIG. 14, the reinforcement member 334 can be like the reinforcement member 34 of FIG. 4. Though not shown, the reinforcement member 334 can include spaced apart ribs and spaced apart rib apertures like those (e.g., ribs and apertures 80, 82) of the assembly 30 of FIG. 4. Additionally, the assembly 330 can include a structural foam 336 that is like the structural foam 36. In particular, the structural foam 336 can be overmolded onto the reinforcement member 334 to attach the structural foam 336 to the reinforcement member 334.

Further, the assembly 330 can include an inner frame member 338 that is the same or similar to the inner frame member 38 of FIG. 4, and can include an outer frame member 344. The outer frame member 344 can be like the outer frame member 44 of FIG. 4 but, as shown in FIG. 14, the outer frame member 344 can have a different shape and can have a mating flange 344a arranged to overlap a lower section 352 of the elongated frame member 332 and not mate directly with flange 332a of the elongated frame member or flange 338a of the inner frame member 338. The shape changes to the elongated frame member 332 and the outer frame member 344 and/or the altered location to which the flange 344a overlaps onto the elongated frame member 332 significantly increases the peak force of the assembly 330 (i.e., the force at which the assembly 330 will fail) and significantly increases the energy absorption of the assembly 330.

Figure 6:
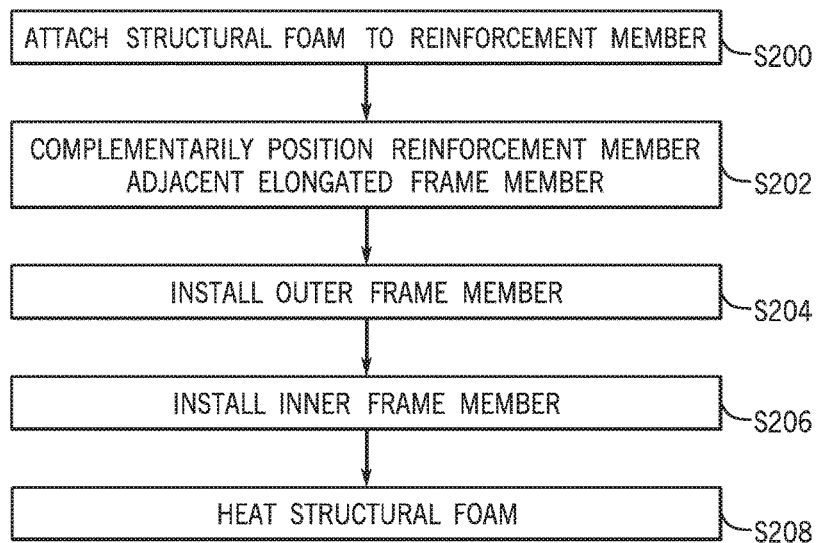
FIG. 6 is a process flow diagram illustrating a vehicle frame structural member assembly method according to an exemplary embodiment.

With reference now to FIGS. 5A-5D and FIG. 6, a vehicle frame structural member assembly method will now be described. In particular, the method can be used with the vehicle frame structural member assembly 30 described hereinabove and will be described with reference thereto, though this is not required and other vehicle frame structural member assemblies can be used. In the method of FIG. 6, at S200, structural foam 36 is attached to reinforcement member 34, which can be formed from a plastic material. The attaching of the structural foam 36 to the reinforcement member 34 in S200 can include overmolding the structural foam 36 onto the reinforcement member 34. In particular, the structural foam 36 can be overmolded onto the inner wall 54 of the reinforcement member 34 and at least a portion of the structural foam 36 can be received within the apertures 78 defined in the inner wall 54. Optionally, and not shown in FIG. 6, the sunroof drain tube 104 can be attached to the reinforcement member 34. This can include installing the sunroof drain tube 104 in the apertures 102 of the clip structures 90.

Next, at S202, the reinforcement member 34 can be complementarily positioned adjacent elongated frame member 32. Complementarily positioning the reinforcement member 34 adjacent the elongated frame member 32 in S202 can include aligning the reinforcement member 34 along the elongated frame member 32. In addition or in the alternative, complementarily positioning the reinforcement member 34 in S202 can include temporarily securing the reinforcement member 34 to the elongated frame member 32 as shown in FIG. 5B.

Temporarily securing the reinforcement member 34 in S202 can include applying the adhesive 64, 66 to at least one of the reinforcement member 34 and the elongated frame member 32. In particular, and as best shown in FIG. 5A, the adhesive 64, 66 can be applied as beads 64a, 64b, 66a. More specifically, beads 64a, 64b can be applied to the lower section 52 of the elongated frame member 32 and the beads 66a can be applied to the upper section 60 of the elongated frame member 32. Though not shown in the illustration in FIG. 5A, in the alternative or in addition, beads of the adhesive 64, 66 could be applied to the reinforcement member 34 instead of or in addition to the beads 64a, 64b, 66a being applied to the elongated frame member 32.

Alternatively or in addition, and as shown in FIG. 5B, temporarily securing the reinforcement member 34 to the elongated frame member 32 in S202 can include mechanically fastening the reinforcement member 34 to the elongated frame member 32. For example, this can be achieved by receipt of the attachment clips 98 in the apertures 100 of the elongated frame member 32. Notably, the attached structural foam 36 remains in the non-expanded state, as illustrated in FIGS. 5A and 5B.

The method of FIG. 6 can additionally include installing the outer frame member 44 at S204 and installing the inner frame member 38 at S206. Installing the outer frame member 44 at S206 can be done by welding the mating flanges 44a, 44b of the outer frame member 44 to the outer sides 46, 48 of the mating flanges 32a, 32b of the elongated frame member 32. Installation of the inner frame member 38 at S206 can include welding mating flanges 38a, 38b of the inner frame member 38 to inner sides 40, 42 of the mating flanges 32a, 32b of the elongated frame member 32. FIG. 5C shows the inner frame member 38 installed and continues to show the structural foam 36 in the non-expanded state. Once the inner frame member 38 is installed, the structural foam 36 is disposed between the structural member 34 and the inner frame member 38.

Next, as shown at S208 in FIG. 6, the structural foam 36 can be heated. As already described herein, the structural foam 36 can be heat activated epoxy foam that expands and bonds to components in which it is in contact. The heating of the structural foam in S208 causes the structural foam 36 to fully fill the gap distance between the reinforcement member 34 and the inner frame member 38 as shown in FIG. 5D. In addition, as cured, the structural foam 36 bonds to the reinforcement member 34 and the inner frame member 38 thereby securing the reinforcement member 34 and the inner frame member 38 together. Heating of the structural foam in S208 can additionally include heating of the adhesive 64, 66, which can have the effect of curing the adhesive 64, 66. In one embodiment, the heating in S208 occurs during the paint oven process in which the vehicle or at least the vehicle frame has paint applied thereto that is then heated in a paint oven as is known and understood by those skilled in the art.

Advantageously, temporarily attaching the reinforcement member 34 to the elongated frame member 32 via the clips 98 allows relative positioning of the reinforcement member 34 to remain intact until the structural foam 36 and/or the adhesive 64, 66 fully cures. Also advantageously, the expanding structural foam 36 allows for complex gap conditions to be managed (i.e., allows for greater tolerance variations). Further advantages of the foregoing assembly 30 and method include replacement of heavier stamped metal parts of the known assembly 10 with relatively lighter weight parts, such as the composite reinforcement member 34. Additionally, more tuning is available for an injection molded part versus a stamped part. Yet a further advantage is realized in that the gauge thickness of the remaining sheet metal parts can be reduced relative to the known assembly 10 of FIG. 7. For example, the elongated frame member 32 can be formed from an UHSS sheet having a gauge thickness of about 1 mm, the inner frame member 38 can be formed from an AHSS sheet having a gauge thickness of about 1.22 mm, and/or the outer frame member 44 can be formed of mild steel having a gauge thickness of about 0.7 mm, though alternate materials and/or gauge thicknesses can be used.

Illustrative methods of making the reinforcement member 34 are provided. Although described with respect to glass fibers, the fibers are not limited to such and may be a different fiber or blends of one or more types of fibers.

In an non-limiting example, the reinforcement member 34 may be made by an injection molding process wherein pre-compounded resin pellets containing glass fibers are used. The glass fibers in the pellets have an average length of 1 mm to 20 mm. In another non-limiting example, the glass fibers in the pellet have an average length of 10 mm to 15 mm. In another non-limiting, the glass fibers have an average length of about 1 mm to 3 mm. In a non-limiting example, the glass fibers in the resulting reinforcement member 34 have an average length of 0.1 mm to about 3 mm. In another non-limiting example, the glass fibers in the resulting reinforcement member 34 have an average length of 0.1 mm to 0.5 mm, or 0.5 mm to 1.5 mm.

Figure 8A:
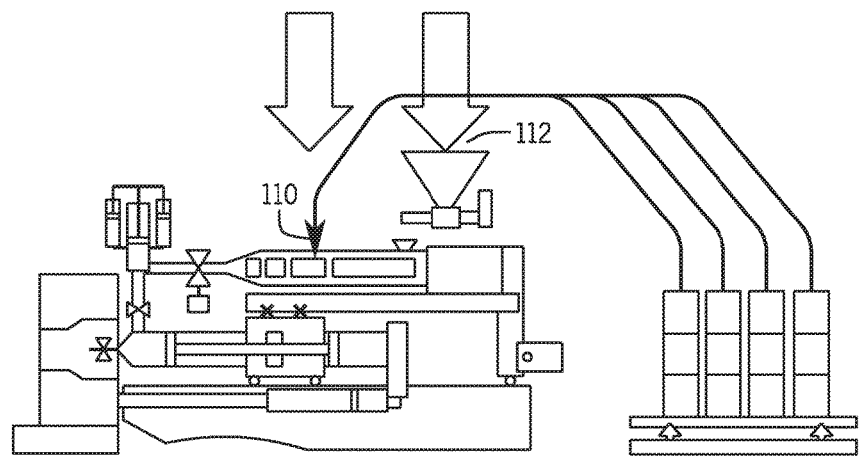
FIG. 8A is a schematic view of an injection molding process for molding a reinforcement member according to an exemplary embodiment.
Figure 8B:
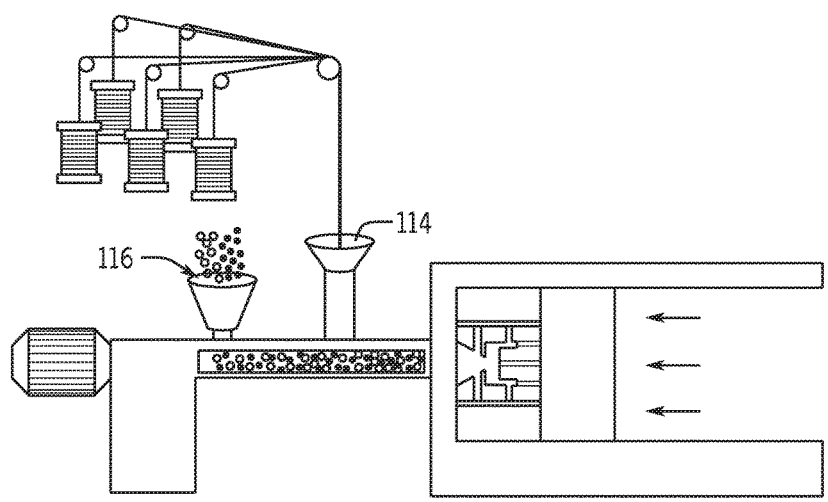
FIG. 8B is another schematic view of the injection molding process of FIG. 8A.

In a non-limiting example as shown in FIGS. 8A and 8B, the reinforcement member 34 may be made by an in-line compounding injection molding process wherein the glass fibers are fed separate from the resin pellets. For example, as schematically shown, glass fibers can be fed at 110 and resin pellets can be fed at 112 in FIG. 8A and glass fibers can be fed at 114 and resin pellets can be fed at 116 in FIG. 8B. In a non-limiting example, the glass fibers fed to the process have an average length of about 40 mm to about 50 mm. In a non-limiting example, the glass fibers in the resulting reinforcement member 34 have an average length of 5 mm to 15 mm. In another non-limiting example, the pellets may contain glass fibers.

Figure 9A:
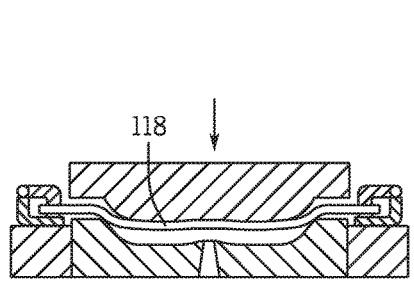
FIG. 9A is a schematic view of a molding process using a fabric for molding a reinforcement member according to an exemplary embodiment.
Figure 9B:
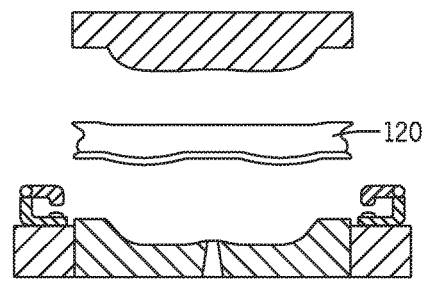
FIG. 9B is another schematic view of the injection molding process of FIG. 9A.

In a non-limiting example as shown in FIGS. 9A and 9B, a fabric 118 or 120 may be provided in the mold prior to injection of the resin material and glass fibers. The fabric 118 or 120 may include, but is not limited to, glass fibers, carbon fibers, aramid fibers, or mixtures thereof. The fabric may be continuous, and may extend substantially the entire length and/or width of the part. In a non-limiting example, the fabric has a thickness of 0.05 mm to 6.0 mm. The fabric 118 or 120 is placed in the mold and is shaped during the closing of the injection mold. The resin (with or without glass fibers) is then injected in the mold to make the reinforcement member 34 or 334.

Figure 10:
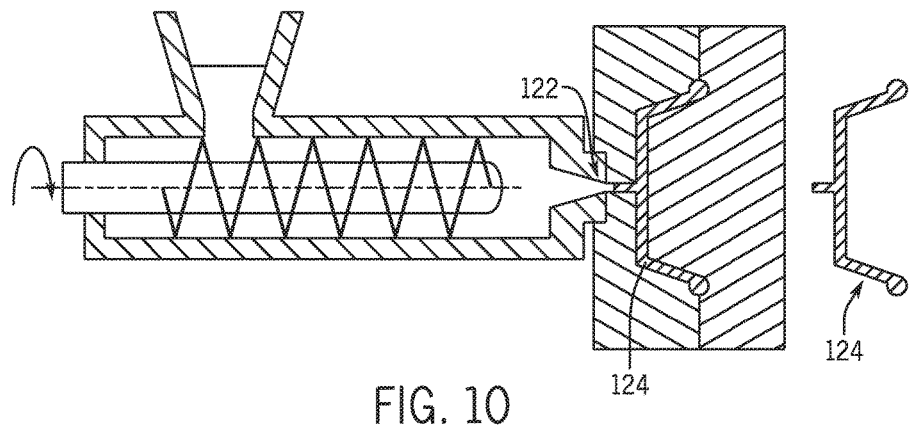
FIG. 10 is a schematic view of an injection molding process showing a feed gate positioned at the center or middle of a reinforcement member being injection molded.
Figure 11:
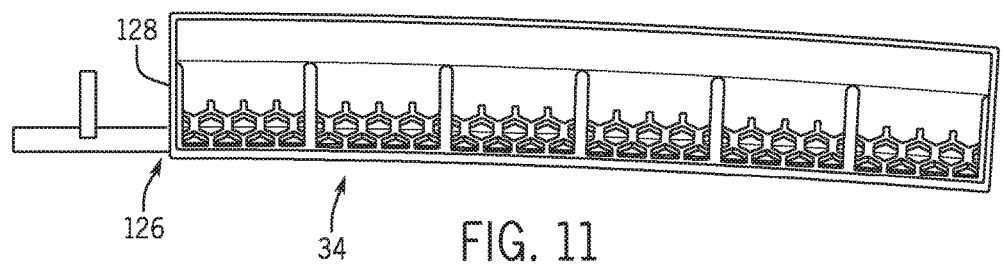
FIG. 11 is a schematic view showing a reinforcement member aligned with a resin feed gate according to an exemplary embodiment.

Typically, as shown in FIG. 10, a feed gate 122 for the production of an injection molded part 124 is positioned at the center or middle of the part 124 so that the resin may flow outward toward the ends. In a non-limiting example as shown in FIG. 11, the reinforcement member 34 (or, alternatively, the reinforcement member 334) is produced by locating a resin feed gate 126 at an end or side 128 of the elongated body of the reinforcement member 34.

Figure 12:
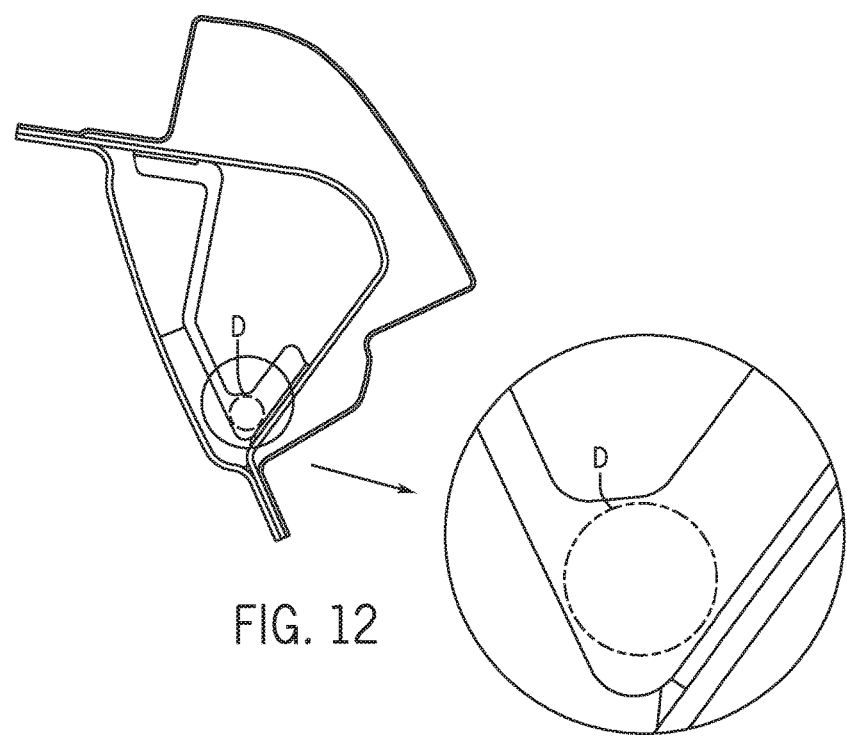
FIG. 12 is a schematic view showing a diameter area on a reinforcement member of a vehicle frame structural member assembly according to an exemplary embodiment.

For example, with additional reference to FIG. 12, the reinforcement member 34 may be provided with a large diameter "D" extending along the length of the reinforcement member 34 that is parallel or coaxial to the feed gate 126, or at least substantially parallel or substantially coaxial to the feed gate 126 (e.g., the reinforcement member 34 can have a large radius of curvature that forms the reinforcement member with a slight curve shape). The diameter D is sized to retain fiber length and fiber orientation and may be directly gated. In a non-limiting example, the diameter D is about 1-7 mm. In another non-limiting example, the diameter D is about 4-5 mm. The diameter D may be the same size as the gate for feeding the resin to the mold, 75% of the size of the gate, or 50% of the size of the gate. In a non-limiting example, the diameter D is the apex 76 formed by the intersection of the lower wall 50 and the inner wall 54 as best shown in FIG. 4. Such arrangements provide overlap between the resin feed gate and the diameter D, which allows for the fibers to avoid (or at least reduce the occurrence of) being subjected to shear and bending stresses. In other words, having the injection flow gate direction aligned with the apex 76 does not substantially disrupt the flow of the injecting resin thereby maximizing final fiber characteristics.

Figure 13:
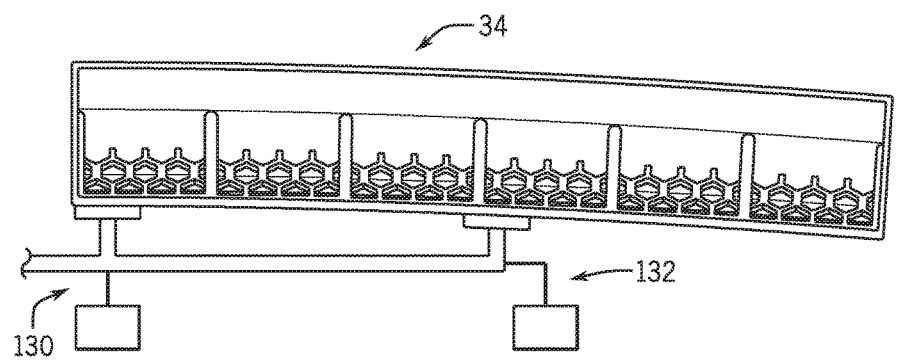
FIG. 13 is a schematic view showing a reinforcement member arranged relative to sequential resin feed gates according to an exemplary embodiment.

In another non-limiting example as shown in FIG. 13, the reinforcement member 34 (or, alternatively, the reinforcement member 334) is produced by locating at least two resin feed gates 130, 132 along the reinforcement member 34 and operating the at least two resin feed gates 130, 132 sequentially. In particular, and only as a non-limiting example, the feed gate 130 can be opened first to begin filling the mold and forming the reinforcement member 34 from the side 128 and then subsequently (e.g., when the reinforcement member is partially formed) the feed gate 132 can be opened. In one non-limiting example, the feed gate 132 is opened after the reinforcement member 34 is at least 25% formed. In another non-limiting example, the feed gate 132 is opened after the reinforcement member 34 is at least 33% formed. In a further non-limiting example, the feed gate 132 is opened after the reinforcement member 34 is near or at least 50% formed.

It will be appreciated that variations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An internal reinforcement comprising:
   an elongate body including a base positioned opposite a crown;
   a shelf extending along the crown, the shelf includes an upper surface positioned parallel to a first leg of a concave frame structure and mates with the first leg; and
   a compressive member extending along the base, the compressive member includes a first wall with a lower surface positioned parallel to a second leg of the concave frame structure and mates with the second leg,
   wherein the compressive member includes a second wall and an energy absorbing structure extending between the first wall and the second wall, and
   wherein the energy absorbing structure is a honeycomb structure.

2. The internal reinforcement of claim 1, wherein the elongate body includes a first side positioned opposite a second side, the shelf extends away from the first side and the first wall of the compressive member extends away from the second side.

3. The internal reinforcement of claim 1, wherein the compressive member includes the second wall extending from the base, and the first wall extends from the second wall.

4. The internal reinforcement of claim 1, wherein the elongate body includes an internal reinforcing material that is a fiber reinforced polymeric material.

5. The internal reinforcement of claim 1, wherein the internal reinforcement is a fiber reinforced polymeric material, and the compressive member includes a second wall with an end extending from the base, and the first wall extends from the end of the second wall, the intersection of the first and second walls form a large diameter to retain fiber length and preferred fiber orientation.

6. The internal reinforcement of claim 1, wherein the internal reinforcement includes a plurality of reinforcements extending from the compressive member to the shelf.

7. The internal reinforcement of claim 1, wherein a plurality of reinforcements extend from the compressive member to the shelf at an angle oblique to an angle that the body extends from the compressive member to the shelf.

8. The internal reinforcement of claim 1, wherein a plurality of reinforcements extend outward from the first side of the body.

9. A vehicle frame structural member assembly comprising:
   an elongated structural member including:
      a concave frame member including a body with a first leg and a second leg extending therefrom, and
      an inner frame member extending from the first leg to the second leg, the elongated frame member and the inner frame member defining a hollow chamber therein;
   a reinforcement positioned in the hollow chamber of the structural member and including:
      an elongate body including a base positioned opposite a crown,
      a shelf extending along the crown, the shelf includes an upper surface positioned parallel to the first leg of the concave frame member and mates with the first leg, and
      a compressive member extending along the base, the compressive member includes a first wall with a lower surface positioned parallel to the second leg of the concave frame member and mates with the second leg, and the compressive member further includes a second wall and an energy absorbing structure extending between the first wall and the second wall, wherein the energy absorbing structure is a honeycomb structure;
   a first adhesive positioned between the shelf and the first leg; and
   a second adhesive positioned between the first wall and the second leg.

10. The vehicle frame structural member of claim 9, wherein the concave frame member and the inner frame member are comprised of one or more Advanced High Strength Steel, Ultra High Strength Steel, 6000 series aluminum and 7000 series aluminum.

11. The vehicle frame structural member of claim 9, wherein the reinforcement is a fiber containing polymeric material.

12. The vehicle frame structural member of claim 9, wherein the compressive member includes the second wall extending away from the base, and the first wall extends away from the second wall, and wherein the second wall is positioned parallel to an outer surface of the inner frame member.

13. The vehicle frame structural member of claim 12, further comprising a third adhesive positioned between the second wall and the inner frame member.

14. The vehicle frame structural member of claim 12, wherein the second wall is positioned a first distance from the inner frame member, the shelf is positioned a second distance from the first leg, and the first wall is positioned a third distance from the second leg, and the first distance is greater than the second distance, and the first distance is greater than the third distance.

15. The vehicle frame structural member of claim 9, wherein the elongate body includes a first side positioned opposite a second side, the shelf extends away from the first side toward the inner frame member and the first wall of the compressive member extends away from the second side.

* * * * *